United States Patent [19]

Stewart et al.

[11] 4,272,495
[45] Jun. 9, 1981

[54] CHEMICAL PROCESSES

[75] Inventors: Phillip S. B. Stewart, Beaumaris; Jeremy J. Lees, Birchgrove, both of Australia

[73] Assignee: Woodsreef Mines Limited, Barraba, Australia

[21] Appl. No.: 5,586

[22] Filed: Jan. 22, 1979

[51] Int. Cl.³ .............................................. B01D 9/02
[52] U.S. Cl. ................................. 423/167; 23/313 AS
[58] Field of Search ............... 23/313 AS; 162/3, 153, 162/155; 210/509; 423/167, 331; 106/308 Q

[56] References Cited

U.S. PATENT DOCUMENTS

| | | | |
|---|---|---|---|
| 2,626,213 | 1/1953 | Novak | 162/155 |
| 2,685,825 | 8/1954 | Novak | 162/3 |
| 3,586,639 | 6/1971 | House | 162/3 |
| 3,679,542 | 7/1972 | Jacquelin | 162/3 |
| 3,965,284 | 6/1976 | Xanthos et al. | 162/155 |

FOREIGN PATENT DOCUMENTS 725714  3/1955  United Kingdom ..................... 162/155

Primary Examiner—Hiram Bernstein
Attorney, Agent, or Firm—Browdy and Neimark

[57] ABSTRACT

String-like agglomerates of chrysotile asbestos fibers are recovered from crude asbestos by first forming a stable gel structure of asbestos and dispersing agent, diluting the gel structure dispersion with water in a first dilution step to form a readily pourable dispersion without dilution of the concentration of dispersing agent to a level insufficient to maintain the asbestos fibrils in a dispersed state, and then, in a second dilution step, rapidly diluting the dispersion with water to reduce the concentration of dispersing agent to a level insufficient to maintain the dispersion, thereby forming agglomerates of the fibrils. Preferably, the dispersion is subjected to an orienting flow during or immediately after the second dilution step to form string-like agglomerates.

17 Claims, 1 Drawing Figure

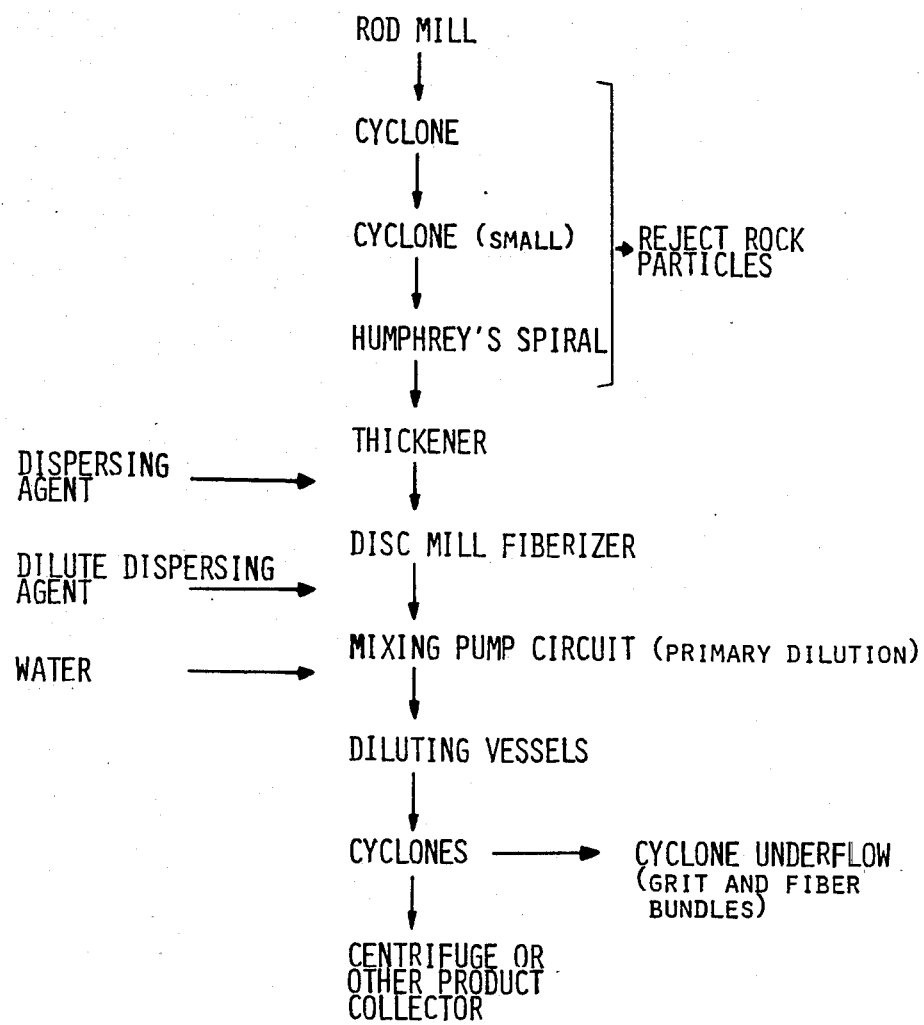

CHEMICAL PROCESSES

The present invention relates to processes for the opening of crude chrysotile asbestos and the recovery of string-like agglomerates of unit, or near unit, chrysotile asbestos fibrils, and to the products obtained from these processes.

As used in this specification the expression "asbestos" is taken to mean chrysotile asbestos unless a contrary intention appears. Asbestos occurs as bundles or seams of individual fibrils within a matrix of serpentine rock. The unit fibrils have a diameter of between about 100 and 500 angstoms and a length which is very large relative to the diameter of the fibrils. The bundles of asbestos fibrils, whether in the rock matrix or partially or fully liberated therefrom, are termed crude asbestos. The present invention is concerned with the opening of crude asbestos to separate the fibrils from one another and to reaggregate the fibrils into string-like agglomerates.

Conventionally, asbestos is liberated from its ore by crushing the ore and winnowing the crushed material such that the liberated asbestos is carried away in air currents. The associated rock is subjected to further crushing and winnowing before being eventually discarded. This process has the dual disadvantage that the process may tend to break the crude fibre into short lengths without adequately separating the unit fiber from one another and that the process creates environmental dust problems.

The value of asbestos depends largely upon the length of the fibers and their degree of separation. Fibres of relatively great length, e.g. ¼" upwards, are very valuable as they can be spun to produce asbestos yarns and like goods. Shorter grades of asbestos which are unspinable but which have sufficient fibrous character to reinforce concrete are less valuable than the spinable fibrils or fibril bundles but more valuable than dust like particles which are difficult to recover and are of very little, if any, value. The conventional processes for the recovery of asbestos either leave in the rock, or liberate but do not effectively recover, quite a lot of dust like short asbestos crudes.

It has been proposed that crude asbestos could be opened by a wet process involving the separation of the fibrils using an asbestos dispersing agent such as a surfactant. This process has been used to produce relatively long spinable fibers obtained from certain of the higher grades of asbestos. The present process is designed to allow the production of asbestos aggregates useful in making asbestos/cement products and/or in spinning from grades of crude asbestos which would yield little or no long or intermediate length fiber by conventional processes.

The present invention consists in a method for producing agglomerates of unit, or near unit, fibrils of chrysotile asbestos from crude chrysotile asbestos, comprising the steps of:

(a) forming a stable gel structure of unit, or near unit, fibrils of asbestos by mixing the crude asbestos with an aqueous solution of an asbestos dispersing agent to disperse the fibrils to form the stable gel structure;

(b) diluting the gel structure dispersion with water in a first dilution step to form a readily pourable dispersion without diluting the concentration of the asbestos dispersing agent to a level where it is insufficient to maintain the asbestos fibrils in a dispersed state; and (c) rapidly diluting the dispersion with water in a second dilution step sufficient to reduce the concentration of the asbestos dispersing agent to a level where it is insufficient to maintain the dispersion such that the dispersion of the fibrils collapses and agglomerates of the fibrils are formed.

The present invention further consists in a method of recovering string-like agglomerates of unit, or near unit, chrysotile asbestos fibrils from crude asbestos comprising the steps of:

(a) forming a stable gel structure of individual asbestos fibrils by mixing the crude asbestos with an aqueous solution of an asbestos dispersing agent effective to disperse the fibers to form a stable gel structure;

(b) rapidly diluting the concentration of the asbestos dispersing agent in the gel structure;

(c) subjecting the dispersion, during or immediately after said dilution step, to an orienting flow; and (d) recovering the string-like agglomerates of unit, or near unit, asbestos fibrils formed in said orienting flow. In a still further aspect, the present invention consists of string-like agglomerates of chrysotile asbestos fibrils produced by the method according to this invention.

The present inventors have found that the formation of a stable gel state upon mixing the crude asbestos material with the solution of dispersing agent is facilitated by applying a shearing force to the asbestos to separate the fibrils from one another. In the simplest case this shearing force can be applied by merely stirring the mixture vigorously as with a spatula. In larger scale operations or with more firmly bonded crude asbestos bundles more complex procedures are required to bring about the desired shearing action.

It has been found that a colloid mill, or similar type of mill such as a paper pulp refiner is particularly suitable for the application of a suitable shearing force to the crude asbestos. It appears that the application of more work to the crude asbestos than the minimum necessary to separate the fibrils from one another is not unduly deleterious to the fibrils. It therefore appears possible to ensure complete separation of the fibrils by passing the crude asbestos and the asbestos dispersing agent solution through a suitable mill of sufficient diameter and of a suitable gap width that more than the minimum shear force is applied to the mixture.

It appears that the dispersing agent solution has the effect of wetting the surfaces of individual asbestos fibrils on the surface of the crude asbestos but will not penetrate into the crude material until the previously wetted fibers are removed from its surfaces. This can be demonstrated by placing a sizeable lump of crude asbestos in a suitable solution of a colloidizing agent. Even after some hours the asbestos will only show wetting and loosening, i.e. opening of fibers of the suface of the lump, if it is left stationary in the solution. If, however, the lump is subjected to an applied shearing force in the solution such as vigorous stirring or rubbing between the fingers it is found that the lump will disperse into a colloidal gel state very rapidly e.g. within five minutes. This explanation of the phenomenon observed by the present inventors is given by way of explanation and is not to be taken as limiting the broad scope of the present invention.

The asbestos dispersing agents used to bring about the dispersion of the asbestos may be ionic or nonionic in character or mixtures of the two types. They are characterized in that they react with or are adsorbed on the surface of asbestos fibers and consequently facilitate the opening of the fibers under the influence of the mechanically applied shear forces and maintain the fibers in stable dispersion.

Preferably the dispersing agents are surfactants, and are selected from the classes of anionic, cationic, non-ionic, and amphoteric surfactants. It has been found that ionic surfactants or mixtures containing them are particularly useful. The most preferred surfactants are of the anionic type and mixtures of anionic and non-ionic types. Where mixtures of surfactants are used they may be added together in the processing or added in sequence when this is beneficial to either the fiberizing, the subsequent coagulation, or the properties of the final product. In the latter case, for example, the mixture of surfactants may be chosen to facilitate the redispersion of the fibers in making cementitious compositions such as asbestos cement.

In the case of the preferred surfactants, some of the surfactant remains strongly adsorbed even after extensive dilution of the fiberizing dispersion.

The concentration and conditions required for optimum fiberizing vary according to both the nature of the surfactant and of the asbestos. Because of its effects on the surface charge of the asbestos, the pH of the solution influences the surfactant adsorption. Amphoteric types of surfactants may display either anionic or cationic character according to the pH of the system. Mixtures of surfactants of the same type, for example, anionic, can be beneficial in optimizing the overall process, but may tend to complicate aspects of reagent recycle.

The surfactant or surfactants for our process may be selected from among the following groups of anionic surfactants: carboxylates, N-acylsarcosinates, alkanesulphonates, linear and branched alkylarylsulphonates, dialkyl sulphosuccinates, arylsulphonates, naphthalenesulphonates, N-acyl-N-alkyl-laurates, 2-sulphoethyl esters of fatty acids, olefin sulphonates, alkyl sulphates, sulphated natural oils, sulphated alkyl-phenol alkoxylates, and phosphate esters of alkanols and phenol and alkylphenol alkoxylates.

The carboxylates, sulphates, sulphonates, and phosphates may be in any of the derivative forms known to those skilled in the art, as for example, the free acid, metal salts such as the magnesium and sodium salts, ammonium and substituted ammonium salts and esters. Typical substituted ammonium salts are those derived from mono-, di- and triethanolamine. We prefer to use the sodium salts since they are readily avilable and generally are convenient to use because they have good water solubility.

The preferred anionic surfactants are those with long chain alkyl groups such as, for example, nonyl, decyl dodecyl, tridecyl, stearyl, cetyl, palmityl and myristyl.

Thus, typical carboxylates that give good results with our process are sodium oleate and sodium laurate. Preferred N-acylsarcosinates are those with the acyl group selected from the group consisting of cocoyl, lauroyl, stearoyl and tall oil acyl.

Typical examples of suitable sulphates and sulphonates are ammonium lauryl sulphate, diethanolamine lauryl sulphate, sodium cetyl sulphate, dodecylbenzenesulphonic acid, sodium dodecylbenzenesulphonate, triethanolamine dodecylbenzene sulphonate, tridecylbenzene-sulphonic acid, nonylnaphthalene-sulphonic acid, sodium butylnaphthalenesulphonate, sodium tetrahydronaphthalene-sulphonate, and α-olefin sulphonate.

The most preferred sulphonates are those derived from sulphosuccinic acid. They are conveniently used in the form of sodium salts of the esterified acids. Specific members of this group that we have found very useful are sodium dihexyl sulphosuccinate, sodium di-(isobutyl) sulphosuccinate, sodium dioctyl sulphosuccinate, disodium N-octadecylsulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols.

Suitable phosphate esters include "Teric" 305 and 306 (alkyl ether phosphates; "Teric" is a Registered Trade Mark).

Suitable cationic surfactants comprise the mono-, di-, and polyamines, amine oxides, alkoxylates of alkyl and alicyclic amines, 2-alkyl-1-(hydroxyethyl)-2-imidazolines, tetrakis-substituted ethylenediamines, amide-linked amines, and quaternary ammonium salts. The amine oxides are of the general formula.

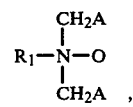

wherein A is hydrogen or hydroxyl, and $R_1$ is selected from the group consisting of cetyl, lauryl, myristyl, stearyl, coco, decyl, hexadecyl and octadecyl, The amide-linked amines are of the general formula

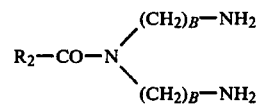

wherein $R_2$—CO—N is derived from the group consisting of coconut, oleic, stearic, and tall oil acids, and B is 2 or 3.

The quaternary ammonium salts are of the general formula

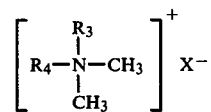

wherein $R_3$ and $R_4$, which may be the same or different, are selected from the group consisting of methyl, benzyl, tallow, stearyl, cetyl, lauryl, and myristyl, dodecylphenyl, and stearyl, and X is bromide, chloride, methanesulphonate, or toluene-sulphonate.

The dialkylpyridinium salts comprise compounds of the general formula

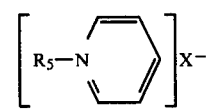

wherein $R_5$ is cetyl or lauryl, and X is as hereinbefore defined.

Cationic surfactants which we have found particularly useful include "Cetrimide" (cetyltrimethylammonium bromide), "Vantoc" CL (lauryl-dimethyl benzylammonium chloride), "Monofluor" 71, and "Fixinol" (cetyl pyridinium bromide). "Cetrimide", "Vantoc", "Monofluor" and "Fixinol" are Registered Trade Marks.

Suitable non-ionic surfactants for the process of our invention may be selected from among fatty acid esters, alkoxylated aliphatic alcohols and alkylphenols, alkoxylates fatty acids and fatty acid amides, and natural fats and oils.

Preferred aliphatic alcohols are selected from the group consisting of ethylene glycol, propylene glycol, glycerol, oleyl alcohol, lauryl alcohol, cetyl alcohol, stearyl alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alcohols, tallow, and sorbitan, and preferred alkylphenols are selected from the group consisting of nonylphenol, dodecylphenol, octylphenol, isooctylphenol, and $C_8$–$C_{12}$-alkyl-phenols. The preferred fatty acids are lauric acid, stearic acid, oleic acid, coco acid, capric acid and myristic acid.

The carboxylic esters are those prepared from carboxylic acids selected from the group consisting of lauric acid, stearic acid, oleic acid, coco acid, palmitic acid, ricinoleic acid, tall oil, soybean oil, rosin, tallow, lard, cottonseed, and safflower oil, and from alcohols selected from the group consisting of glycerol, sorbitan, ethylene glycol, diethylene glycol, propanediol, and poly(oxyethylene).

It is preferred that the alkoxylates be ethoxylates which contain from 1 to 50 ethyleneoxy (—$CH_2CH_2$—O—) units per molecule. The amines used to prepare the fatty acid amides are selected from the group consisting of ethanolamine, diethanolamine, and isopropanolamine.

Non-ionic surfactants which have been found to be particularly useful include the glycol esters of oleic and lauric acid, ethoxylated nonyl phenols, polyethyleneglycol methacrylate, and "Teric" 9A8 (an ethoxylated aliphatic alcohol; "Teric" is a Registered Trade Mark).

Suitable amphoteric surfactants are substituted amino-acids, such as N-coco-3-aminopropionic acid disodium N-lauryl-3-iminodipropionate, N-carboxymethyl-N-cocoalkyl-N,N, dimethylammonium hydroxide, the sodium salt of N-hydroxyethyl-N-lauromido-$\beta$-alanine, and substituted 2-imidazolinium hydroxides.

Other chemical agents that may be used for the process of our invention include tannin, dextrin, alkanoic acids, and lignosulphates such as sodium lignin sulphonate and calcium lignosulphate. The latter are closely related to the sulphonate surfactants described hereinbefore, but are not usually considered "surfactants" by those skilled in the art.

The dispersing agent is preferably added to the asbestos agglomerates as an aqueous solution containing from 0.8% to 10%, most preferably 5%, of the dispersing agent. The solution is preferably added in an amount which will allow the asbestos to be thoroughly wetted and such that the surfactant is able to form layers on the surfaces of the individual fibers as the crude asbestos is opened up in order to ensure the stability of the gel structure formed. In preferred examples, three parts by weight of the solution are added to one part by weight of asbestos containing material.

It will be realized that the processes according to the invention may be applied to the raw asbestos containing ore or to concentrates of such asbestos obtained e.g. by conventional crushing and winnowing procedures or by wet processing techniques. The processes may also with advantage be applied to open up purified asbestos in order to increase the surface area of the asbestos as an alternative to conventional carding or fiberizing processes known to those skilled in the art.

Once a stable gel-like dispersion of the asbestos fibers has been obtained it is then necessary to treat the dispersion to recover the asbestos fibers in a useful form. It has been found by the present inventors that it is possible to recover the asbestos in the form of string-like agglomerates of fibrils.

The parameters which appear to be critical to the recovery of the aforementioned string-like agglomerates are that the gel-like dispersion should be rapidly diluted without destruction of the physical involvement and that, upon, or immediately after, dilution, the diluted dispersion should be subjected to an orienting flow.

It is believed, although applicants do not wish to be bound by this explanation, that the effect of the rapid dilution of the dispersion is to allow the dispersing agent to diffuse away from the fibrils, while retaining the fibrils in sufficiently close proximity, that the fiber structure of the gel can collapse such that an agglomerate of fibrils is formed. If this formation of an agglomerate takes place in an orienting flow field then the new agglomerate will take the form of an elongate string of asbestos fibers in which each fiber is overlapped with, and entangled with or adhered to, the next adjacent fibers in the string.

The orientation of the flow field may be brought about in the simplest form of the invention by stirring the water into which the gelled dispersion is poured. As the dilution takes place strings of fibrils form and can be readily recovered from the diluted dispersion. In one sophisticated arrangement agglomeration of the gelled dispersion may be brought about by extruding the gel-like dispersion under pressure through a suitable orifice into a dilution bath to simultaneously bring about the dilution and the oriented flow field.

It has been found that substantially improved results are obtained in the present process if the dilution of the dispersion is carried out in two stages. The first dilution is preferably to a fiber/liquid ratio of from 1:10 to 1:80 more preferably 1:15 to 1:50; however, as long as the dilution is sufficient to render the dispersion pourable, improved results are obtained provided that the dilution is not sufficient to reduce the concentration of the dispersing agent to a level wherein the dispersion is no longer maintained.

After the first dilution, the dispersion may be readily tested to determine the degree of opening of the asbestos which has been achieved. If the diluted dispersion is centrifuged, three layers are normally observed, the lowermost layer being comprised of particles of the rock matrix surrounding the asbestos; the intermediate layer comprises particles of asbestos which have not been reduced to unit, or near unit, fibrils; and the supernatant comprises a dispersion of fibrils. The supernatant dispersion is particularly suitable for use in the formulation of string-like agglomerates in the second dilution stage. The centrifugation technique may be useful in commercial production to enable the recycling of the unopened asbestos particles.

The second dilution step must be carried out rapidly for the reasons discussed above. The degree of dilution is preferably sufficient to give a fiber/liquid ratio of from 1:100 to 1:400.

It is, however, sufficient to dilute the dispersion until agglomeration takes place. While it is desirable that the second dilution takes place into an orienting stream, this is not essential to this aspect of the present invention. It is possible to form agglomerates having useful properties merely by appropriately diluting the dispersion.

While the various aspects of this invention have been described with reference to chrysotile asbestos it is believed that this invention could have utility with crocidilite and amosite asbestos forms as well. The statement of the essential features of this invention are to be read to include the treatment of crocidilite and amosite asbestos forms within their scope.

Hereinafter described by way of example are experiments exemplifying the processes according to the present invention:

EXAMPLES 1 TO 4

25 gram samples of chrysotile asbestos crudes obtained by the dry processing of asbestos ore were mixed with a predetermined quantity of 5.0% or 2.5% by volume aqueous solution of Matexil WA-OT (Registered Trade Mark) a surfactant having asbestos dispersing properties, in a Silverson blender. The dispersions formed are detailed in Table I.

TABLE 1

| Test No. | Reagent Conc. | Reagent Addition | Added Matexil | Matexil/Fibre |
|---|---|---|---|---|
| 1 | 5.0% | 75 ml | 3.75 | 0.15 |
| 2 |  | 125 ml | 6.25g | 0.25 |
| 3 | 2.5% | 75 ml | 1.88g | 0.075 |
| 4 |  | 125 ml | 3.13g | 0.125 |

10 gram samples of each of the gels listed in Table 1 were diluted separated in 100, 200, 500, 1000 and 2000 ml aliquots of water to produce the dispersion shown in Table II.

TABLE II

| | Final Conc. of Reagent (% by volume) (Nominal)* | | | | |
|---|---|---|---|---|---|
| | Dilution Volume | | | | |
| Test No. | A 100 | B 200 | C 500 | D 1000 | E 2000 |
| 1 | 0.35 | 0.18 | 0.073 | 0.037 | 0.019 |
| 2 | 0.38 | 0.20 | 0.082 | 0.041 | 0.021 |
| 3 | 0.18 | 0.09 | 0.037 | 0.019 | 0.009 |
| 4 | 0.19 | 0.10 | 0.041 | 0.021 | 0.010 |

It was found that when the dilution had been carried out a rough measure could be made of the average length of the string like agglomerations of fibrils by catching the strings on a spatula and measuring the length draped on each side of the spatula. Table III gives the results of a measurement of an average length on one side of the spatula.

TABLE III

| | Approximate Fiber Lengths (mm) | | | | |
|---|---|---|---|---|---|
| Test No. | Dilution Volume | A 100 | B 200 | C 500 | D 1000 | E 2000 |
| 1 | | — | — | 10 | 12 | 15 |
| 2 | | — | — | Viscous or Gelantinous Fluid | 14 | 20 |
| 3 | | — | 4 | 5 | 4 | 3 |
| 4 | | — | — | 15 | 13 | 15 |

The dilutions for tests 1A, 1B, 2A, 2B, 3A, 4A and did not produce any apparent fiber. Rather the gel broke into lumps and dispersed to give a lumpy fluid. When these were blended using the Silverson mixer a smooth gelatinous fluid was obtained similar to that from test 2C. All of these fluids poured readily, and when introduced as a thin stream into swirling water long gelatinous filaments coagulated which condensed into fiber strings (not 3A). Fiber strings of exceptional length could be produced consistently in this way (30–35 mm).

Reference to Table II shows that the minimum concentration of Matexil above which the fiber could be maintained in a dispersed state was about 0.08%. Slow dilution by stirring in small increments of water produced apparently poor fiber (<2 mm).

The fibers produced by tests 1C-E, 2D-E, and 4C-E, were all very similar and of reasonable quality. Those from tests 3B-E were relatively poor. It would appear that the fiberizing treatment in forming the gel of test 3 was inadequate and the fiber was not opened enough, or sufficiently dispersed, to be able to form extended fiber strings.

If the first stage dilution is carried out without due care localized areas of the dispersion may be caused to collapse due to the concentration of the asbestos dispersing agent being allowed to fall below the concentration necessary to maintain the dispersion. It has been found that the agglomerates formed by such point agglomeration within the dispersion are hard to redisperse in the diluted solution of the asbestos dispersing agent. In order to avoid such undesirable point agglomeration it is preferred that the dilution be carried out with a very dilute solution of the asbestos dispersing agent rather than with pure water. Most preferably the concentration of the asbestos dispersing agent in the diluent solution is the minimum necessary to prevent point agglomeration of the asbestos fibrils in the dispersion. In the case of the dispersing agent used in the foregoing examples, "Matexil WA/OT" a concentration of 0.2% by weight is desirable in the dilutent solution.

EXAMPLE 5

25 grams of C 30 asbestos fiber were mixed with 125 ml of 5% by weight solution of Matexil WA-OT in a Silverson blender to produce a dispersion having a liquid to solid ratio on a weight basis of 5:1 and a Matexil to fiber ratio on a weight basis of 0.25:1.

10 grams of the dispersion were diluted into 1000 ml of water with moderate stirring to produce string-like agglomerates of fibrils. The diluted dispersion had a Matexil concentration of 0.04% by weight and a liquid to solid ratio on a weight basis of 600:1.

The string-like agglomerates of fibrils were found to have an apparent average length of 3 cm.

EXAMPLE 6

25 grams of C 30 asbestos fiber were mixed with 75 ml of a 5% by weight solution of Matexil WA-OT in a Silverson blender. The dispersion so produced had a liquid to solid ratio on a weight basis of 3:1 and a Matexil to fiber ratio on a weight basis of 0.15:1.

1000 mls of water were blended into the dispersion with stirring and the diluted dispersion again passed through the Silverson blender. The diluted dispersion was found to have a liquid to solid ratio of 43:1 and a Matexil concentration of 0.35% by weight.

The diluted dispersion was poured into 6.5 l. of swirling water to produce string-like agglomerates of an apparent average length of 7 cm. This final mixture showed a liquid to solid ratio of 300:1 and a Matexil concentration of 0.05%.

respects than the fiber concentrate used as raw material and the dumped gel. The results are recorded below.

Pump (A) was of conventional impeller drive, while pump (B) was of peristaltic design to provide a gentle pulsating flow. Jet (1) produced a fan-shaped stream and jet (2) was a length of rubber tubing that could be directed to various parts of the diluted slurry. Spray (a) was a device giving a multiplicity of fine spray jets and spray (b) differed in that there were fewer fine spray jets and in that the jets were essentially parallel to one another.

| Dilution Method | Flexural Strength kg/cm$^2$ | % Fiber in Plaques | FSU | Bauer McNett Sizing % | | |
|---|---|---|---|---|---|---|
| | | | | +4 | +14 | −200 |
| Pump (A), Jet (1) | 307 | 11.0 | 100 | 38.4 | 46.1 | 41.2 |
| Pump (A), Spray (a) | 297 | 11.0 | 97 | 40.9 | 48.7 | 38.7 |
| Pump (B), Spray (b) | 266 | 11.0 | 88 | 44.0 | 49.8 | 38.1 |
| Pump (B), Spray (a) | 294 | 11.0 | 95 | 43.7 | 51.7 | 36.9 |
| Pump (B), Jet (2) | 316 | 11.4 | 99 | 38.2 | 46.3 | 43.0 |
| Dumped fiber dispersion | 276 | 11.0 | 89 | 34.1 | 43.0 | 40.8 |
| Dumped fiber gel | 307 | 15.1 | 73 | 14.4 | 33.8 | 55.8 |
| Fiber Concentrate | 286 | 17.4 | 57 | 1.4 | 4.1 | 72.0 |

EXAMPLE 7

400 grams of C 30 asbestos fiber were blended with 1000 ml of a 5% by weight solution of Matexil WA-OT with a spatula. The mixture was passed through a "Van Gelder" plate mill set with the plates virtually touching to produce a stiff gel.

The gel was diluted by stirring in 8 l. of an 0.2% by weight solution of Matexil. The diluted dispersion, which showed no point agglomeration during the dilution step, had a liquid to solid ratio on a weight basis of 23:1 and a Matexil concentration of 0.73% by weight.

The diluted dispersion was centrifuged at 3000 r.p.m. at a radius of 50 cm for 2 minutes to produce 5 l. of an opalescent supernatant liquid.

When the supernatant was poured in a thin stream into 40 l. of swirling water, string-like agglomerates having an apparent average length of 10 cm were produced. This mixture had a Matexil concentration of 0.08% by weight.

EXAMPLE 8

670 g of asbestos fiber was added to a 5% solution of "Matexil" WA-OT (2000 ml), preheated to 90° C., and the mixture fiberized for a short time in a high speed macerator in several batches to produce a fiber concentrate mixture in the form of a highly viscous mass incapable of being poured. 400 g of the mixture was removed and dumped with minimal stirring into 20 liter of water. The remaining recombined slurry was diluted with 13.5 liters of 0.25% "Matexil" WA-OT and split into six identical parts, each of which was diluted further to agglomerate the fibres by adding to 20 liters of water in different ways. The coagulated products were each collected using a centrifuge.

Five of the coagulation stage experiments were carried out with different combinations of pumps linked with various sprays and jets. In a sixth case the fiber dispersion was dumped rapidly into the dilution water with minimal stirring. All of the methods according to the present invention showed good flexural strength values for asbestos cement plaques, and similar Bauer-McNett sizing characteristics, and were better in both It will be seen that the dumped fiber gel, i.e. the undiluted dispersion, performed much more poorly than any of the other samples which were given a two stage dilution. This example serves to show the advantages obtainable using the two stage dilution according to the present invention.

EXAMPLE 9

A pilot scale plant was constructed which followed the flow diagram shown in the drawings.

From 2 tonnes of chrysotile ore from the Woodsreef Mine at Barraba, New South Wales, passed through this plant the following results were achieved:
Reject Rock: 74%
Finished Product: 10%
Cyclone Underflow: 7% (50% fiber bundles to be returned to process)
Other waste products: 9%
The average flexure strength 236 at 12½% fiber.
FSU value approximately 70

It is to be noted that the above ore treated by the conventional dry process yields approximately 3% recoverable asbestos.

In the pilot plant referred to above the dilution vessels in which flocculation took place consisted generally of two stirred tanks in series and a stream of dispersion is introduced into the swirling flow. The flows were adjusted so that an overall dilution rate of 200:1 was achieved and a primary dilution rate of 15:1.

We claim:

1. A method for producing agglomerates of unit, or near unit, fibrils of chrysotile asbestos from crude chrysotile asbestos, comprising the steps of:
    (a) forming a stable gel structure of unit, or near unit, fibrils of asbestos by mixing the crude asbestos with an aqueous solution of an asbestos dispersing agent to disperse the fibrils to form the stable gel structure;
    (b) diluting the gel structure dispersion with water in a first dilution step to form a readily pourable dispersion without diluting the concentration of the asbestos dispersing agent to a level where it is insufficient to maintain the asbestos fibrils in a dispersed state; and (c) rapidly diluting the dispersion with water in a second dilution step sufficient to reduce the concentration of the asbestos dispersing agent to a level where it is insufficient to maintain the dispersion such that the dispersion of the fibrils collapses and agglomerates of the fibrils are formed.

2. A method of recovering string-like agglomerates of unit, or near unit, chrysotile asbestos fibrils from crude asbestos, comprising the steps of:

(a) forming a stable gel structure of individual asbestos fibrils by mixing the crude asbestos with an aqueous solution of an asbestos dispersing agent effective to disperse the fibers to form a stable gel structure;

(b) rapidly diluting the concentration of the asbestos dispersing agent in the gel structure sufficiently to reduce the concentration of the asbestos dispersing agent to a level where it is insufficient to maintain the asbestos fibrils in a dispersed state;

(c) subjecting the dispersion, during or immediately after said dilution step, to an orienting flow, and (d) recovering the string-like agglomerates of unit, or near unit, asbestos fibrils formed in said orienting flow.

3. A method as claimed in claim 1 or claim 2 wherein the asbestos dispersing agent is an anionic or a non-ionic surfactant or a mixture thereof.

4. A method as claimed in claim 3 wherein the anionic surfactant is selected from the group consisting of carboxylates, N-acylsarcosinates, alkanesulphonates, linear and branched alkylarylsulphonates, dialkyl sulphosuccinates, arylsulphonates, naphthalenesulphonates, N-acyl-N-alkyl-laurates, 2-sulphoethyl esters of fatty acids, olefin sulphonates, alkyl sulphates, sulphated natural oils, sulphated alkyl-phenol alkoxylates, and phosphate esters of alkanols and phenol and alkylphenol alkoxylates.

5. A method as claimed in claim 4 wherein the anionic surfactants are sulphates and sulphonates selected from the group consisting of ammonium lauryl sulphate, diethanolamine lauryl sulphate, sodium cetyl sulphate, dodecylbenzene-sulphonic acid, sodium dodecylbenzenesulphonate, triethanolamine dodecylbenzene sulphonate, tridecylbenzene-sulphonic acid, nonylnaphthalene-sulphonic acid, sodium butylnaphthalene-sulphonate, sodium tetrahydronaphthalene-sulphonate, and α-olefin sulphonate.

6. A method as claimed in claim 5 wherein the sulphonate surfactants are derived from sulphosuccinic acid.

7. A method as claimed in claim 6 wherein the sulphonated surfactants derived from sulphosuccinic acid are selected from the group consisting of sodium dihexyl sulphosuccinate, sodium di-(isobutyl) sulphosuccinate sodium dioctyl sulphosuccinate, disodium N-octadecylsulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols.

8. A method as claimed in claim 1 or claim 2 wherein a shearing force is applied to the mixture of the crude asbestos and the aqueous solution of the asbestos dispersing agent to facilitate the formation of the stable gel structure.

9. A method as claimed in claim 8 wherein the shearing force is applied to the mixture by passing it through a device selected from the group comprising colloid mills and paper pulp refiners.

10. A method as claimed in claim 1 wherein the aqueous solution of the asbestos dispersing agent contains from 0.8% to 10% by weight of the dispersing agent.

11. A method as claimed in claim 1 wherein the first dilution is to a fiber/liquid ratio on a weight basis of from 1:10 to 1:80.

12. A method as claimed in claim 1 wherein the second dilution is to a fiber/liquid ratio on a weight basis of from 1:100 to 1:400.

13. A method as claimed in claim 1 wherein the dispersion is subjected to an orienting flow during or immediately after the second dilution.

14. A method in accordance with claim 10 wherein the aqueous solution of the asbestos dispersing agent contains about 5% by weight of the dispersing agent.

15. A method in accordance with claim 11 wherein the first dilution is to a fiber/liquid ratio on a weight basis of from 1:15 to 1:50.

16. A method in accordance with claim 12 wherein the second dilution is to a fiber/liquid ratio on a weight basis of about 1:200.

17. Agglomerates of asbestos fibrils produced by the method according to claim 1 or claim 2.

* * * * *